(12) United States Patent
Merrill et al.

(10) Patent No.: US 6,884,384 B2
(45) Date of Patent: Apr. 26, 2005

(54) METHOD FOR MAKING A HIGH TEMPERATURE EROSION RESISTANT MATERIAL CONTAINING COMPACTED HOLLOW GEOMETRIC SHAPES

(75) Inventors: Gary Brian Merrill, Orlando, FL (US); Jay Edgar Lane, Murrysville, PA (US); Curtis Gosik, Irwin, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 376 days.

(21) Appl. No.: 09/965,558

(22) Filed: Sep. 27, 2001

(65) Prior Publication Data

US 2003/0080477 A1 May 1, 2003

(51) Int. Cl.$^7$ .................................................. B28B 1/26
(52) U.S. Cl. ...................... 264/642; 264/651; 264/660
(58) Field of Search .............................. 264/628, 632, 264/635, 640, 642, 643, 651, 660

(56) References Cited

U.S. PATENT DOCUMENTS

| | | | |
|---|---|---|---|
| 4,423,097 A | 12/1983 | Mons et al. | |
| 4,450,184 A | 5/1984 | Longo et al. | |
| 4,530,884 A | 7/1985 | Erickson et al. | |
| 4,639,388 A | 1/1987 | Ainsworth et al. | |
| 4,917,960 A | 4/1990 | Hornberger et al. | |
| 5,064,727 A | 11/1991 | Naik et al. | |
| 5,080,934 A | 1/1992 | Naik et al. | |
| 5,416,795 A | * 5/1995 | Kaniuk et al. | 373/155 |
| 5,705,231 A | 1/1998 | Nissley et al. | |
| 5,709,919 A | 1/1998 | Kranzmann et al. | |
| 5,759,932 A | 6/1998 | Sangeeta et al. | |
| 5,780,146 A | 7/1998 | Mason et al. | |
| 5,962,076 A | 10/1999 | Mason et al. | |
| 5,985,368 A | 11/1999 | Sangeeta et al. | |
| 6,013,592 A | 1/2000 | Merrill et al. | |
| 6,071,628 A | 6/2000 | Seals et al. | |
| 6,197,424 B1 | 3/2001 | Morrison et al. | |
| 6,235,370 B1 | 5/2001 | Merrill et al. | |
| 6,235,665 B1 | * 5/2001 | Pickrell et al. | 501/9 |

* cited by examiner

Primary Examiner—Christopher A. Fiorilla

(57) ABSTRACT

A method for making a thermal insulating material includes the steps of: providing a chamber, placing hollow geometric shapes in the chamber, closing the chamber, evacuating air from the chamber, feeding a slurry into an adjacent slurry chamber, pressurizing the slurry chamber and forcing the slurry in to the sphere chamber around the spheres against a fibrous material adjacent a side wall of the sphere chamber. The fibrous material allows capillary wicking of the liquid from the slurry around the spheres. Due to this pressure the spheres and slurry are semi dried into a green state. The material in its green state green is subsequently dried and fired to form the insulating material.

21 Claims, 2 Drawing Sheets

METHOD FOR MAKING A HIGH TEMPERATURE EROSION RESISTANT MATERIAL CONTAINING COMPACTED HOLLOW GEOMETRIC SHAPES

GOVERNMENT CONTRACT

This invention was made with government support under NIST Cooperative Agreement 70NANB9H3037. The government of the United States of America has certain rights in this invention pursuant to that contract.

BACKGROUND OF THE INVENTION

1. Field of the Invention

The present invention relates to a method of making high temperature, erosion resistant materials that are used in high temperature environments.

2. Background Information

Most components of combustion turbines are operated at very high temperatures and often require the use of specialized coatings/inserts to protect underlying supporting materials. These specialized coating/inserts include thermal barrier coatings (TBCs), turbine blade tip inserts, and abradable seals disposed opposite the turbine blade tips.

Conventional TBCs typically comprise a thin layer of a ceramic material covering an alloy. In many applications, the coatings must be resistant to extremely high temperature, erosion resistant. These materials may also be used as an abradable material. An example of an abradable material is turbine ring seal segments, which fit with tight tolerances against the tips of turbine blades, must withstand erosion and must preferentially wear or abrade in order to reduce damage to the turbine blades, and form a tight seal with the turbine blade. Protective coating system can include several layers including a metallic bond or barrier coating of MCrAlY having an alumina scale and, for example, a columnar yttria stabilized zirconia thermal barrier, which can be further coated by an erosion resistant layer of alumina or silicon carbide, applied by physical vapor deposition techniques.

Fillers have also been used. There, abradable stationary seal walls, for jet turbine housings which seal opposing, rotating rotor blade tips, have a ceramic core containing from 30 vol. % to 98 vol. % solid ceramic filler, where the ceramic fills a honeycomb wall structure. This is then covered with erosion and corrosion resistant outer layer, which is made porous by uniformly dispersed, finely divided filler. This is apparently applied by a spraying technique. The pores can be filled with ceramic, metal oxide or carbide materials. Fillers mentioned include hollow $ZrO_2.8YO_3$ ceramic spheres and solid $Al_2O_3$, SiC, TiC and BN spheres.

Other abradable honeycomb structures have been developed for use in turbines. Low melting fluorides, such as $BaF_2$, are incorporated into a stabilized zirconia or alumina matrix which, in turn, is used to fill a honeycomb shroud lining made of, for example, a metal alloy. The filling becomes molten when the rotating blade tips rub the shroud, and upon resolidification, improve the smoothness of the abraded surface. Another variation of reinforced ceramic layers, including a honeycomb matrix for use in a turbine as abradable seals.

Also, U.S. Pat. No. 6,013,592 which is referenced here and is incorporated herein in its entirety, teaches a material containing hollow ceramic particles embedded in an interconnected ceramic matrix, to provide a composite thermal barrier coating system having superior erosion resistance and abrasion properties for use on combustion turbine components. The hollow particles were preferably spherical and made of zirconia, alumina, mullite, ceria, YAG or the like, having an average particle size of about 200 micrometers (0.2 mm) to 1500 micrometers (1.5 mm). The steady state erosion rate, (grams lost/kg of erosive impacting media or g/kg), of this filler was 3.2 g/kg vs. 4.6 to 8.6 g/kg for conventional TBCs.

The present invention is a method of forming an insulating material. And more specifically for forming the insulating material into larger three dimensional geometric shapes, such as cylinders. Here, the insulating material is formed by providing a permeable structure that has a contacting surface. A fibrous material is placed against the contacting surface of the permeable structure and then the hollow ceramic spheres are placed against the fibrous material. A slurry mixture containing a binder and filler particles is either poured directly into the space containing the hollow spheres, or into a space adjacent to the hollow spheres. Then, pressure is applied such that the slurry passes around the hollow spheres filling in any voids between the spheres and such that the slurry is also forced against the fibrous material. This fibrous material allows capillary wicking of the liquid in the slurry thereby permitting the filler particles to fill the void spaces between the spheres. The fibrous material also allows controlled removal of the liquid in the slurry and allows controlled partial drying of the sphere and slurry casting. This insulating material casting is then further heat dried then fired to create a ceramic matrix material that is highly resistive to erosion and has a very low thermal conductivity.

U.S. patent application Ser. No. 09/267,237 (Merrill et al., filed on Dec. 20, 1999) described a material useful as an erosion resistant layer for turbine applications. There, closely packed hollow, geometric shapes, such as hollow spheres were mixed with binder and filler particles, cast into a mold, dried and then fired to provide abradable, porous, thermally stable seals, and the like. This system works well for making flat structures.

The present invention has been developed as an improved process of forming larger three dimensional geometric shapes, in view of the foregoing, and to address other deficiencies of the prior art. Therefore, it is one of the main objects of this invention to provide a method making a high temperature, erosion resistant coating and material which is non-shrinking, thermally insulating, in larger geometric shapes and thermally stable up to at least 1600° C., and which has constrained stabilized porosity and insulating properties, as well as controlled thermal conductivity and thermal expansion properties.

SUMMARY OF THE INVENTION

These and other objects of the invention are accomplished by providing method of making an insulating material, useful as an erosion resistant high temperature layer, for large geometric shapes comprising the steps of providing a first permeable structure having a contacting surface, and a second structure which may or may not be permeable depending on the size and geometry of the part. As the part size increases, the second structure is more likely to be permeable. These first and second structures define a void space for both an extractable fibrous insulation member and for the hollow spheres. Hollow ceramic spheres are placed in the sphere chamber against the contacting surface, pouring a slurry against the hollow spheres, and applying pressure such the slurry passes around the hollow spheres filling in any voids adjacent the spheres and being forced against the contacting surface.

Next, an extracting member of fibrous material is located against the contacting surface of the first permeable structure. This extracting member, in combination with the two structures noted above, defines the geometry of the void space or sphere chamber which is filled by the hollow ceramic spheres and slurry and which facilitates the drying of the insulating material by allowing capillary wicking of the liquid from the slurry around the spheres thus partially drying the resulting insulating material structure. The partially dried material is then further dried and fired for use as a thermal barrier.

Preferably, the geometric shapes are selected from rigid, hollow, essentially closed ceramic spheres and other similar geometric shapes of low aspect ratio, less than 10 and preferably less than 5, such as hollow cylinders and the like. The shapes are "individually formed," defined here as formed separately and stabilized, rather than being formed in situ on a substrate etc. The hollow ceramic shapes have "dense" walls, defined here as having a density from 90% to 100% of theoretical (0% to 10% porous). Because the geometric shapes are independently formed and fired at temperatures above their intended use temperature, dense wall formation occurs and a non-sinterable rigid shape results, which allows crack deflection and general toughening of the material, as well as allowing stabilization to very high temperatures approaching 1700° C. If needed, void spaces between the larger hollow geometric shapes can be filled with smaller diameter hollow geometric shapes, to reduce void volume.

Preferably, there are three dimensional closed packed structures of hollow shapes, that can be any geomety, such as, spheres, cylinders, ovoids, etc. This close packed structure provides strength, a nonsinterable stable structure, and a mostly isotropic material and it also minimizes large void spaces and provides a uniform macro- and micro-porosity distribution within the sphere. The material should have some measure of porosity, at least 15 vol. % but preferable between 40 vol. % to 70 vol. % for turbine thermal insulating and abradable coatings.

The method of this invention allows such porous shapes having close packed structures which, when sintered, can be either friable and/or erosion resistant depending on the processing parameters (such as sphere size, wall thickness, composition, etc) while maintaining a low elastic modulus when formed into large or complex three dimensional geometric shapes, such as a combustion liners or vane airfoil for combustion turbine engines.

BRIEF DESCRIPTION OF THE DRAWINGS

The invention is further illustrated by the following non-limiting drawings, in which.

DETAILED DESCRIPTION OF THE PREFERRED EMBODIMENTS

Figure 1:
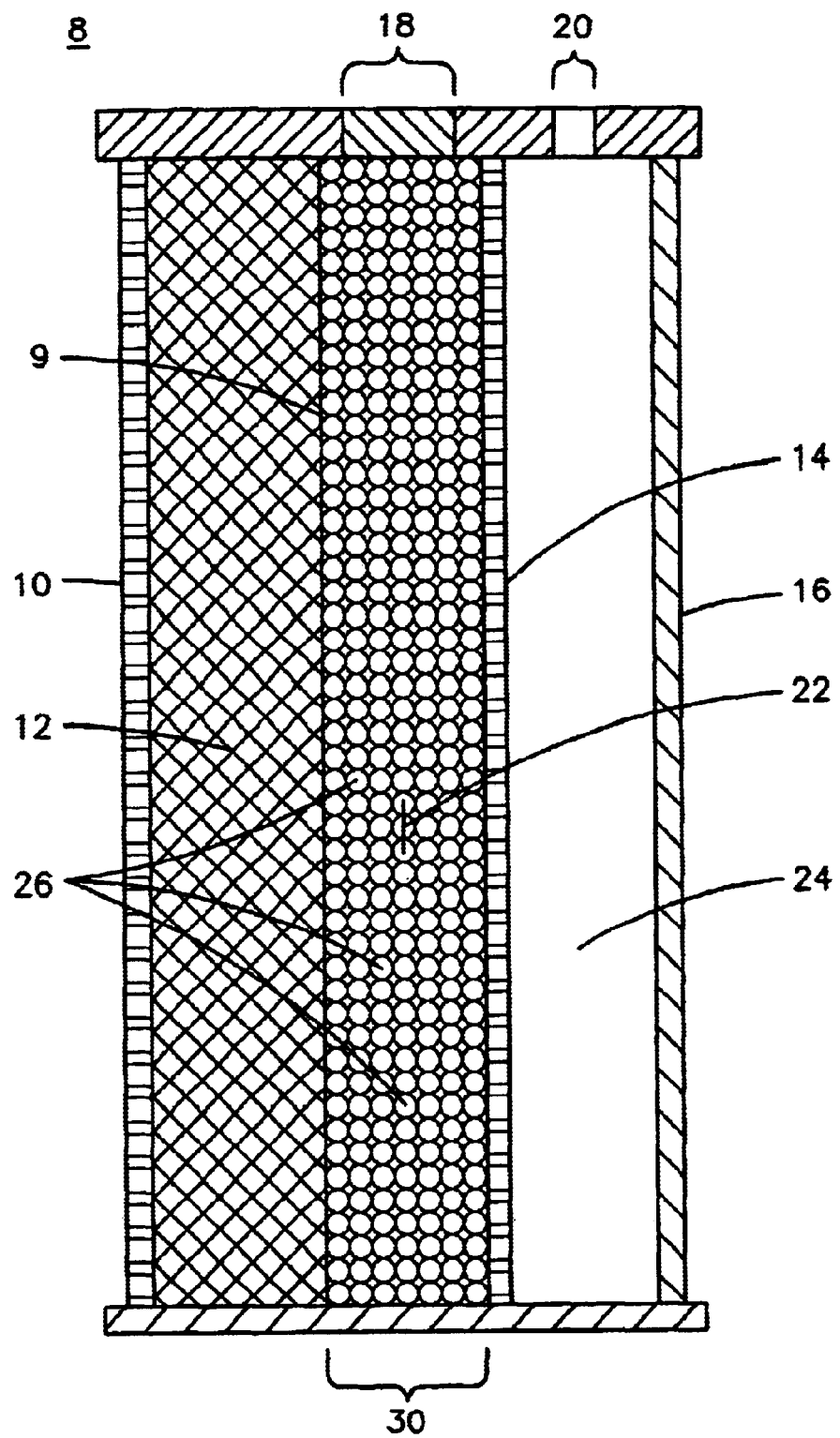
FIG. 1 is a cross-section of the apparatus to perform the methods of the present invention.
Figure 2:
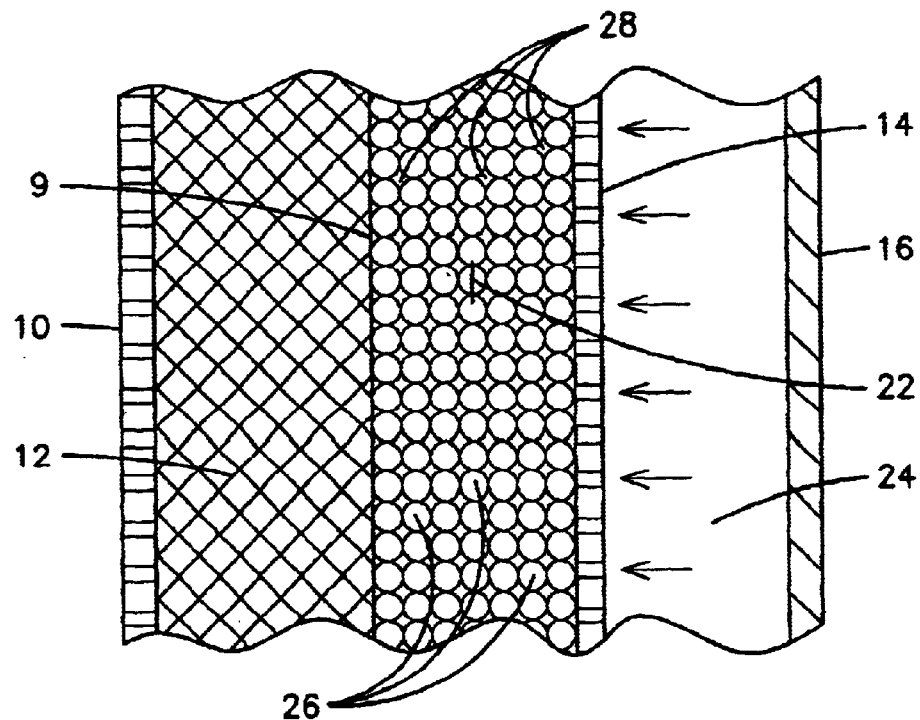
FIG. 2 is an magnified view of the apparatus used for the method of the present invention.

Referring to FIGS. 1 and 2 there is shown the mold apparatus used for the method of the present invention. The mold apparatus 8 includes a first permeable wall structure 10, an extracting fibrous material 12, a second permeable wall 14 and a impermeable wall 16. The permeable wall 10 and 14 along with the impermeable wall 14 are closed on the ends to define voids between the walls 10, 14, and 16 or chambers 24, and 30 there between. Openings 18 and 20 are provided as an entry point into the chambers 24 and 30. The function of each of these elements in accordance with the present invention will be discussed in more detail hereafter.

The method of the present invention begins with filling the chamber 30 with geometric shapes 26 such as spheres which are preferably hollow. The geometric shapes 26 are preferably compacted by vibrating the mold 8 or by other means to insure that the voids or spaces between each geometric shapes or spheres 26 are minimized.

Referring to both FIGS. 1 and 2, most spheres 26 contact at least two other spheres 26, with a substantial number, that is about 70% contacting three other spheres 26. The voids or spaces 28 between the spheres 26 provide a moderate porosity to allow a slurry to pass around the spheres 26.

Now focusing on the characteristics of the spheres 26, the erosion performance of the present inventions resulting insulating material 22 is achieved through the use of dense-walled geometric shapes which are resistant to small particle erosion. Abradability is likewise achieved through the introduction of coarse geometric shapes with (more than 100 microns) closed porosity. The simultaneous optimization of both erosion resistance and abradability is achieved through judicious selection of the values and scale of closed porosity, hollow sphere size and wall thickness. The contribution of the spaces 28 that are filled with a slurry comprised of a binder and filler material is primarily in the mechanical integrity of the structure (strength and elastic constants). The filler material occupies the void spaces 28 and the binder coats both the filler material and the spheres and can also fill small void spaces between the filler material particles and the spheres. During firing, the binder sinters together the filler and sphere materials to provide a rigid structure.

The method of the present invention has almost universal chain formation in three dimensions of the spheres 26, i.e. a uniform isotropic close-packed structure, providing a high level of constrained stabilized uniform spherical porosity. That is, the chains prevent collapse and shrinking of the insulating material 22 at temperatures approaching 1700° C. It is easy to see how the present invention's 50 vol. % to 90 vol. % hollow shape, here hollow sphere configuration, allows minimizing the void spaces 28. Providing an array, as closely packed as that shown in FIGS. 1 and 2, where the void spaces 28 are essentially filled by the slurry, requires a specialized method of packing and impregnation, as will be discussed in detailed hereafter. The hollow geometric shapes are "substantially close packed" meaning that the array is as shown in the type array shown in FIGS. 1 and 2, where the coordination number, is greater than or equal to 1.

Figure 3:
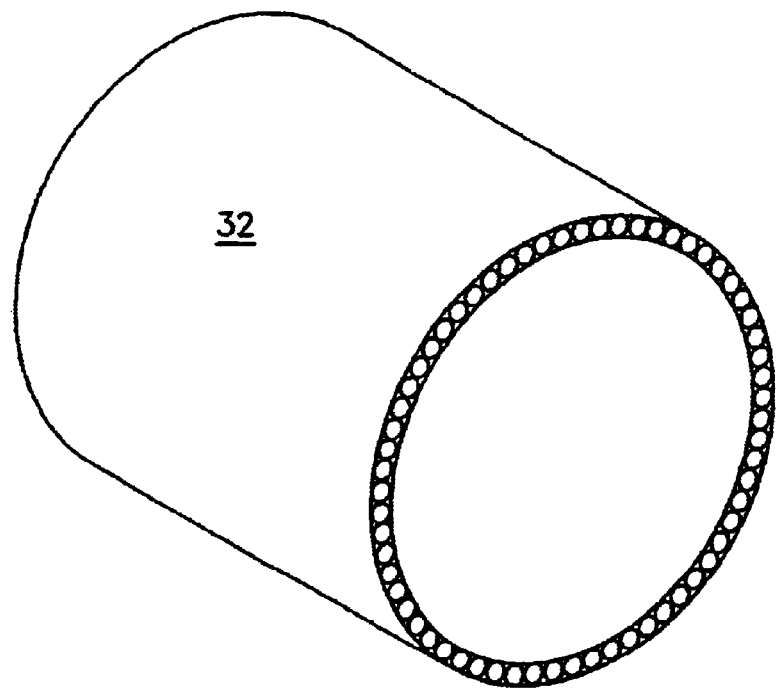
FIG. 3 is the thermal insulating material of the present invention cast into a large geometric shape, a cylinder.

More specifically referring now to FIG. 2, which more clearly illustrates the method of this invention, the spheres 26, are preferable hollow ceramic spheres having walls, which are shown. Optionally, smaller hollow shapes, such as hollow spheres, as well as the slurry can be used to fill void space 28 between the hollow spheres 26. The hollow ceramic spheres 26 are manufactured such that the sphere walls are near 70% to 100% of theoretical density, preferably near 90% to 100% of theoretical density (10% to 0% porous). For good erosion resistance, the wall thickness is preferably between about 100 micrometers to 400 micrometers, depending on sphere diameter. The hollow ceramic spheres 26 are non-sinterable objects which uniquely control the dimensional stability of the material 22 and inhibit volumetric shrinkage during sintering of the resulting insulating material 22. The hollow spheres 26 are also critical in establishing the unique macro- and microstructure of the material 22 and in controlling its unique behavior, both thermally and mechanically. The level of closed macroscopic porosity within the material 22 is defined by the overall size of the hollow ceramic spheres, the wall thickness of the spheres, and their packing arrangement within the structure. The binder material that interstitially bonds or sinters the hollow ceramic spheres together during firing may also contribute a secondary role to these properties depending on the mechanical and thermal properties and the amount of binder materials used. The structure of the resulting material 22 into large geometric shapes such as a cylinder 32, as shown in FIG. 3, in accordance with the method of the present invention, imparts unique combinations of properties including, for gas turbine applications, excellent erosion resistance, insulating properties, fix components such as combustors and the like and may also be used where abradability is needed which is not achieved by conventional means.

As stated above, the resulting material 22, using the method of the present invention, has closed macroscopic porosity, via the use of hollow ceramic spheres 26 (or similar geometric shapes) of size ranges between 150 micrometers diameter to 5000 micrometers diameter, which are independently formed and subsequently bonded together to form a macroscopic infrastructure. The bulk density of these spheres 26 themselves is anywhere between 0.1 and 0.9 of theoretical, that is 10% to 90% of theorectical density, taking into account the internal porosity, and depending upon the needs for each high temperature application. The close-packed, contiguous structure defines and controls the thermal and mechanical properties of the material 22 and maintains dimensional stability of the material 22 as a thermal insulating layer. Coordination numbers for the sphere packing can range from 1 to 14, but preferably, the coordination number of substantially all of the hollow shapes is from 5 to 12, and even more ideally from 5 to 8 for gas turbine coating applications. Some degree of randomness in the coordination number may be desired depending upon the application strength, toughness, abradability and erosion resistance requirements. However, idealized packing arrangements and high coordination numbers in the 8 to 14 range, may be preferred for stiffness-driven applications such as cores for sandwich structures.

It is critical that the spheres 26 be separately formed and stabilized and then used as such in this method vs. their being formed in-situ. The individually formed and bonded spheres impart unique properties to the resulting material 22 Forming the spheres separately allows the stabilization of the spheres to a much higher temperature than otherwise possible. This tailored pore structure is in contrast to the other coating methods where in-situ formed voids are generally interconnected, thus increasing the overall size of critical defects and weakening the structure, the present invention does not produce interconnected void networks thus making it a stronger more stabilized material.

The ceramic hollow spheres 26 will typically have a wall thickness-to-radius ratio ("t/r" ratio) of between 0.05 to 0.50. Depending upon the application, this "t/r" ratio can vary, for example: for lightweight insulation material where erosion is not critical (or is accommodated), t/r in the lower end of this range is desirable; for insulating or abradable coatings, that is, in a gas turbine, where erosion is a concern, t/r between 0.1–0.4 is preferable; for very strong or more erosion resistant materials, the higher end of the t/r range is desirable.

For many applications, the absolute value of the wall thickness is critical to achieving adequate erosion resistance. Therefore, the t/r and overall diameter of the spheres must be considered. For example, if a 200 micrometer wall thickness is required for erosion resistance, and the overall bulk density of the material 22 is defined by abradability requirements, that is, about 60%, this helps narrow down the range of sphere sizes possible (other variables include sphere packing density and matrix density). Wall thickness will generally range from about 0.05 mm (50 micrometers) to 5.0 mm (500 micrometers).

The shape of the hollow particles 26 is ideally spherical, for ease of manufacture and for attaining isotropic properties. However, other similar shapes can be readily made and incorporated in like manner and perhaps introduce certain optimized properties, for example, the shapes can be hollow elongated spheroids or needlelike shapes either randomly oriented or preferentially oriented parallel or perpendicular to the substrate surface and having aspect ratios less than 5-to-1 and lengths between 150 micrometers and 5000 micrometers. Hollow ellipses or other irregular spheroids can be made and indeed are within the normal range of sphere manufacture. Mixtures of spheres, spheroids, low aspect ratio cylinders and other shapes are also natural extensions for use in the method of this invention and, in fact, at least one manufacturing process for hollow spheres also produces hollow, long needle structures. While the invention involves a method of making a insulating material 22, it is important to recognize the unique properties and parameters of that system, which are accomplished by the manufacturing techniques which will be detailed shortly.

Overall bulk density of the entire material 22 made using the method of this invention, including the sphere density, their packing arrangement, and the filler/binder slurry or matrix material is generally in the range of 0.10 to 0.80 of theoretical density, depending on the application. For the example of turbine engine coatings for either insulation or abradability (or both), the range of overall density of the material 22 and its makeup can vary over a wide range. By controlling the bulk density, that is, sphere size, sphere wall thickness and matrix, the matrix comprises both the binder and filler materials, density) of the material 22, the properties can be optimized for erosion resistance and/or abradability. The best range for abradable coatings is 30% to 80% theoretical density. The best range for erosion resistance is from about a 0.3 to 0.5 t/r within the 30% to 80% range.

Note that while FIGS. 1 and 2 show cases of regular packing of uniformly sized spheres 26, the packing of the spheres is not limited to either form or packing nor is it limited to uniformly sized spheres, nor is it limited to any kind of regularity of structure (random packing is more the norm and is allowable so long as the at least substantially "close-packing" criteria is met). Non-uniform sphere sizing may be desirable to achieve higher sphere packing densities while maintaining randomness of the structure.

Sphere walls must be over 70% dense, but are preferably near theoretical density (90% to 100% of theoretical density) to maintain thermal stability over the widest range of temperatures. The high density of the sphere walls imparts excellent erosion resistance and controls the thermal and mechanical behavior of the material 22. The manufacturing temperature of the hollow spheres is well in excess of the intended use temperature of the material 22, for example, mullite ($3Al_2O_3 \cdot 2SiO_2$) hollow spheres can be manufactured at 1750° C., rendering them inert and stable in a material 22 operating indefinitely at 1600° C. to 1700° C. Separately forming and stabilizing the spheres to high temperatures ensures the thermal and dimensional stability of the resulting material 22 of the present invention method at future high temperature operating ranges up to 1700° C. and possibly beyond.

The hollow ceramic spheres, 26 rods, etc. are bonded together interstitially by a ceramic matrix's binder material to form a contiguous and self-supporting structure. The matrix material itself begins as a slurry that is flowable around the spheres 26 with the resulting interconnected network of spheres, filler particles in void spaces and the binder material forming contiguous structures of the resulting material 22. The matrix material is the resulting phases of the binder and filler materials which form during sintering; typically the filler does not change phase but the binder may go through several phase changes during the firing process. The binder material can be a chemical solution, a polymeric or colloidal sol, a very active fine powder dispersed in a fluid medium, etc. A key property of the binder is that it is an active readily sintereable material, whereas, both the spheres and the filler materials are typically inactive mostly nonsinterable materials. The volume content of the matrix material can vary from near zero to completely filling in the interstitial space between the hollow shapes. Preferably the matrix constitutes a minimum of 10% of the interstitial space between the hollow shapes for all coordination members. The binder content and final density are tailored to achieve the desired properties for the specific application, taking into account: the desired bond strength between hollow shapes; the overall bulk density required for abradability and erosion purposes; the individual and packing densities of the hollow shapes; permeability requirements; overall mechanical strength of the system; overall thermal conductivity properties desired; and mass considerations (for example, for flight applications).

The binder may or may not contain filler or reinforcing media, including but not limited to, smaller hollow spheres or other geometric shapes, powders, particles, platelets, and whiskers or chopped fibers or other discontinuous fibrous materials. In the case of thick-walled shapes where t/r is greater than 0.25, it may be advantageous to minimize the amount of matrix in the system—so long as the bond strength and other criteria are met. A very strong structure, particularly in compression, can be achieved with very little matrix addition.

The composition of the ceramic hollow shapes can be any oxide or non-oxide ceramic material including (but not limited to) those shown in Table 1 below:

TABLE 1

| OXIDES | CARBIDES | NITRIDES |
|---|---|---|
| Alumina, Silica | SiC, WC, NbC | $Si_3N_4$, TiN |
| Mullite, Zirconia | TaC, HfC, ZrC | SiCN |
| Zircon, YAG, Yttria | TiC | |
| Ceria, Hafnia, Beryllia | | |

The ceramic matrix material may be either of an oxide based or a non-oxide based composition, including (but not limited to) the compositions also shown in Table 1 above.

Typically, high temperature, stable ceramic particulate materials are used for the fillers in the matrix system for the material 22. The purpose of these fillers may be to add density to the matrix (without necessarily adding strength), add strength to the matrix, add toughness to the matrix, either via reinforcing or residual stress management, or improve the volumetric yield of matrix infiltrates (cost savings). Preferably the matrix slurry based binder mixture is mullite and mono-aluminum phosphate solution but they can also be, composition but not limited to those in Table 2 below, and typical binders are listed in Table 3 below.

| TABLE 2 | | TABLE 3 |
|---|---|---|
| PARTICULATE | | BINDER |
| Mullite | with | Aluminosilicate/ Aluminumphosphate |
| Alumina | with | Aluminumphosphate/ Aluminumoxychloride |
| Zirconia | with | Aluminumorthophosphate |
| Hafnia | with | Aluminumorthophosphate |
| Yttria | with | Aluminumorthophosphate |
| Yttrium Aluminum Garnet (YAG) | with | Aluminumorthophosphate |
| Ceria | with | Aluminumorthophosphate |
| Silicon Carbide or Silicon Nitride | with | Polycarbosilane |
| Hollow Shapes of the Above | with | All Binders Listed Above |

These materials are slowly mixed together, usually with deionized water, to allow good dispersion to form the slurry. In some cases an acid, such as nitric acid, may be added to maintain the pH of the slurry infiltration solution in the range of approximately 3 to 4.

In the method of the present invention, the slurry chamber 24, is provided to initially contain slurry. The slurry is poured into the slurry chamber 24 through opening 20. As stated above the spheres 26 are in place in sphere chamber 30, in a close packed array. The porous membrane 14 is used to define one side of the sphere chamber 30. The porous membrane 14 may be any suitable membrane or sheet of material having perforations therein. For example the membrane 14 can be a sheet of stainless steel having perforation therein, with the perforation having a diameter of 1.5 mm and spaced apart 3 mm between each perforation hole center. This diameter of the perforations are smaller than the diameter of the spheres 26 but larger enough to allow the slurry mixture to pass there through.

The fibrous material 12 defines the other side of the sphere chamber 30. This fibrous material allows the liquid of the slurry to pass through, but does not allow the filler to pass through. The permeable structure 10 provides for easy separation is plastic based, is typically less than 0.5 mm thick and can be removed easily after infiltration or during partial firing of the entire assembly. A filter maybe used against the fibrous material for easy release for the insulating material from the fibrous material. The filter is typically made of paper and less than 0.25 mm thick that will and will burn away during the firing process leaving no residue.

Continuing to describe the method of the present invention, once the geometric shapes 26 are placed into a chamber 30, through opening 18 the opening 18 is closed, thereafter the slurry, filled or unfilled, is fed into the slurry chamber 24 through opening 20. The slurry is continuously supplied into the slurry chamber 20 until the spheres chamber 24 is compacted and the slurry chamber 24 is full. Pressure is applied to the slurry chamber 20 through opening 20. This pressure thereby forces the slurry to penetrate through the porous membrane 14, as shown by the arrows and around the spaces or voids of between the geometric shapes 26, which shapes are substantially close packed, usually as required for the material desired. The pressure is applied at approximately 2 psi to 12 psi but preferably is applied between 7 psi and 10 psi. The slurry chamber is then maintained under pressure of between 2 psi and 12 psi for a length of time between 0.1 hrs. and 5 hrs. depending upon the size and thickness of the material 22.

This method provides good permeation and penetration of the matrix slurry into the void spaces 28 especially for three dimensional geometric shapes such as a cylinder as shown in FIG. 3. The extracting member 12 of fibrous material allows capillary wicking of the liquid from the slurry to occur, thus drying the resulting insulating material to a green state. This green state is characterized by the material 22 being semi dried and having structurally integrity such that, depending upon the thickness, the insulating material 22 maybe removed from the mold. If the thickness of the material is small then the material 22 maybe removed from the chamber 30 with the extracting membrane 12 of fibrous material. Optionally prior to the geometric shapes 26 being placed into the chamber 30 a porous film maybe placed against the extracting membrane 12 for easy removal of the insulating material 22 from the extracting membrane material 12. Once removed the insulating material 22 is then dried followed by heating and possibly sintering at a stepped temperature rate and, optionally, binding to a substrate, such a ceramic matrix composite or alloy. The entire mold can be heated up to about 80° C. to 120° C., as an initial heating step to dry the material 22.

The material 22 can be heated to about 120° C. to further drying the material 22. After the extracting membrane is removed, it can be further heated, in steps of 2° C. to 10° C. per minute, to 1000° C., to form a secure, unitary structure. To form a true refractory version, the body can be fired by further heating, in steps of 3° C. to 10° C. per minute, to about 1600° C. and held for approximately four to ten hours.

The method of this invention goes beyond phosphate bonding of ceramic hollow spheres using aluminum phosphate and controlled capillary drying of slurry based components to make three-dimensional type layers that could be bonded to a substrate having the same three dimensional shape. This invention is projected for use in complex 3D components such as vane airfoils and combustor liners. This invention provides for the application to complex 3D shapes because it employs alternate binders to bond together the ceramic spheres and filler powders. Specifically, the processing is not based on capillary drying but is rather based on a process of impregnation, preferably under pressure. The mold forms used can be of any required shape, which means that complex shape forms of these coatings can be produced. This process is more controllable and can also be tailored to provide different coating structures to suit requirements such as erosion resistance and abradability.

A number of liquid binder solutions can be used to form effective binding of the system. These include monoaluminum phosphate, aluminum hydroxyl chloride and ceramic sols that generate alumina, silica, yttria or zirconia solids. All of these binders dictate different and specific firing schedules.

Other applications for the material 22 of this invention may include making materials for application as combustor liners (can, annular, and can-annular configurations), transition ducts, static airfoils and platforms (vanes), seals (both blade tip and interstage), and virtually any static surface exposed to a hot gas path. Aerospace applications include aircraft hot gas (engine exhaust) impinged structures and surfaces; thermal protection systems (TPS) for aerospace vehicles (hypersonic or re-entry protection); stiff, light-weight panels or structures for space systems (satellites, vehicles, stations, etc.), etc. Diesel or other ICE applications include cylinder liners, exhaust ports, header liners, etc.

The present invention may be embodied in other forms without departing from the spirit or essential attributes thereof, and accordingly, reference should be made to both the appended claims and the forgoing specification as indicating the scope of the invention.

What is claimed is:

1. A method of making an insulating material used as a thermal insulating layer, comprising the steps:

providing a first permeable extracting membrane material structure that is permeable to a liquid portion of a slurry comprising a sinterable binder but that is not permeable to a solid portion of the slurry;

providing a second permeable structure at a distance away from the first structure thereby defining a first void between the first and second permeable structures;

placing geometric shapes in the first void between the first and second permeable structures;

providing an impermeable restraining structure a distance away from the second permeable structure and opposite the first structure defining a second void between the second permeable structure and the impermeable structure;

introducing the slurry into the second void between the second permeable structure and the impermeable structure;

applying pressure in the second void between the second permeable structure and the impermeable structure forcing the slurry through the second permeable structure and around the geometric shapes thereby filling in any voids adjacent the geometric shapes and being forced against the first permeable structure to form the insulating material;

removing the insulating material from between the first and second permeable structures; and heating and drying the insulating material.

2. The method of according to claim 1 further comprising the step of compacting the geometric shapes in the first void between the first and second permeable structures after placement of the geometric shapes in the first void.

3. The method of according to claim 1 wherein the step of applying pressure causes capillary wicking of liquid from the slurry due to the extracting membrane member and further extracting any excess liquid from the slurry.

4. The method of according to claim 1, wherein the step of applying pressure causes capillary wicking of liquid from the slurry to form the insulating material, and further comprising the step of drying the insulating material at a drying temperature for an amount of time sufficient to dry the insulating material to a green state.

5. The method of according to claim 4 further comprising the step of firing the insulating material after the drying step at a temperature at least to 1200° C.

6. The method of according to claim 5, further comprising drying the insulating material and firing the insulating material at temperatures between 80–120° C. and 1,000–1600° C. degrees respectively.

7. The method of according to claim 6 wherein the step of firing comprises ramping the temperature up at a rate between 3 degrees per minute and 10 degrees per minute from 120° C. to 1600° C.

8. The method of according to claim 1 wherein the first and second permeable structures are formed in respective geometric shapes dependant upon a planned use of the insulating material as a thermal insulating layer.

9. A method of making a ceramic material for use as a thermal barrier layer, comprising the steps:

providing a permeable structure having a first surface;

providing a fibrous material adjacent to the first surface of the permeable structure;

providing a porous membrane at a distance from the fibrous material, wherein the porous membrane and fibrous material define a sphere chamber;

placing hollow spheres into the sphere chamber;

providing an impermeable structure at a distance from the porous membrane, wherein the porous membrane and impermeable structure define a slurry chamber;

placing a flowable slurry comprising a sinterable binder into the slurry chamber;

applying pressure into the slurry chamber such that the slurry infiltrates through the porous membrane and around the hollow spheres and against the fibrous material;

removing liquid from the slurry in the slurry chamber to form a matrix material around the hollow spheres;

removing the matrix material and hollow spheres from the slurry chamber; and heating the matrix material to form the ceramic material for use as a thermal barrier layer.

10. The method according to claim 9 wherein the permeable structure and the fibrous membrane provide a means for capillary wicking of liquid from the slurry through the permeable structure.

11. The method according to claim 9 wherein the slurry comprises oxide filler and aluminum phosphate and a liquid.

12. The method according to claim 9 wherein the porous membrane is a perforated sheet of material defining plurality of holes therein having a diameter to allow an even flow of the slurry to pass therethrough and provides an even distribution of the slurry into the sphere chamber around the spheres.

13. The method according to claim 9 wherein the hollow spheres are selected from the group consisting of Mullite, Alumina, Zirconia and any combination thereof.

14. The method according to claim 9 wherein the fibrous material comprises aluminosilicate fibers.

15. The method according to claim 9 wherein the step of applying pressure is achieved by applying 5 to 20 psi of pressure.

16. The method according to claim 9 further comprising the step of:

continuing the step of applying pressure to wick liquid out of the slurry through the fibrous material to dry the slurry to form the matrix material; and removing the matrix material from the sphere chamber and drying the matrix material at a drying temperature for an amount of time to dry the matrix material to a green state.

17. The method according to claim 16 further comprising the step of firing the matrix material after the drying step at a temperature at least to 1200° C.

18. The method of according to claim 17 wherein the steps of drying the matrix material further comprises heating the matrix material.

19. The method of according to claim 18 wherein the heat drying and firing steps occur at a temperature between 100° C. and 1500° C. degrees and for an amount of time up to 12 hours.

20. The method of according to claim 17 wherein the step of drying and firing wherein the temperature is ramp up at a rate between 2° per minute and 15° per minute.

21. The method of according to claim 9 wherein the permeable structure, the fibrous material, and the porous membrane have respective geometric shapes dependant upon the end use of the ceramic insulating material.

* * * * *